US011153345B1

(12) United States Patent
Lee et al.

(10) Patent No.: US 11,153,345 B1
(45) Date of Patent: Oct. 19, 2021

(54) ONE-WAY TRANSFER DEVICE WITH SECURE REVERSE CHANNEL

(71) Applicant: Fend Incorporated, Arlington, VA (US)

(72) Inventors: Sang Cheon Lee, Ashburn, VA (US); Colin Patrick Dunn, Falls Church, VA (US); Paul Carroll, Chevy Chase, MD (US); Philip Quebe, Middlebrook, VA (US)

(73) Assignee: Fend Incorporated, Arlington, VA (US)

( * ) Notice: Subject to any disclaimer, the term of this patent is extended or adjusted under 35 U.S.C. 154(b) by 0 days.

(21) Appl. No.: 17/302,696

(22) Filed: May 10, 2021

Related U.S. Application Data (60) Provisional application No. 62/704,650, filed on May 20, 2020.

(51) Int. Cl.
*H04L 29/06* (2006.01)
*H04L 9/06* (2006.01)
*H04L 9/32* (2006.01)

(52) U.S. Cl.
CPC ............ *H04L 63/18* (2013.01); *H04L 9/0643* (2013.01); *H04L 9/3215* (2013.01)

(58) Field of Classification Search
CPC ...... H04L 63/18; H04L 9/0643; H04L 9/3215
See application file for complete search history.

(56) References Cited

U.S. PATENT DOCUMENTS

| 5,574,722 A | * | 11/1996 | Slykhouse | .............. H04L 12/44 370/257 |
| 5,703,562 A | * | 12/1997 | Nilsen | .................. G06F 11/1625 340/286.02 |
| 6,901,075 B1 | * | 5/2005 | Baron | ..................... H04L 63/02 370/392 |
| 7,675,867 B1 | * | 3/2010 | Mraz | ..................... H04L 63/123 370/254 |

(Continued)

FOREIGN PATENT DOCUMENTS

| EP | 3229439 A1 | 10/2017 |
| EP | 3502911 A1 | 6/2019 |
| WO | 2014164976 A1 | 10/2014 |

OTHER PUBLICATIONS

WIPO, "International Search Report for PCT/US2021/031666," dated Jun. 23, 2021, 4pgs.

(Continued)

*Primary Examiner* — J. Brant Murphy
(74) *Attorney, Agent, or Firm* — Schafer IP Law (57) ABSTRACT

A data diode provides a flexible device for collecting data from a data source and transmitting the data to a data destination using one-way data transmission across a main channel. On-board processing elements allow the data diode to identify automatically the type of connectivity provided to the data diode and configure the data diode to handle the identified type of connectivity. Either or both of the inbound and outbound side of the data diode may comprise one or both of wired and wireless communication interfaces. A secure reverse channel, separate from the main channel, allows carefully predetermined communications from the data destination to the data source.

19 Claims, 8 Drawing Sheets

(56) References Cited

U.S. PATENT DOCUMENTS

| | | | |
|---|---|---|---|
| 8,139,581 B1* | 3/2012 | Mraz | H04L 63/105 |
| | | | 370/392 |
| 8,223,205 B2* | 7/2012 | Frenkel | H04N 5/23206 |
| | | | 348/150 |
| 9,264,288 B1* | 2/2016 | Arora | H04L 29/08072 |
| 9,305,189 B2* | 4/2016 | Mraz | G06F 21/82 |
| 9,473,300 B2* | 10/2016 | Coleman | H04L 9/0827 |
| 9,917,442 B2* | 3/2018 | Beauregard | H04L 67/34 |
| 9,961,108 B2* | 5/2018 | Coleman | H04B 10/00 |
| 10,474,613 B1 | 11/2019 | Dunn et al. | |
| 2005/0033990 A1* | 2/2005 | Harvey | H04L 63/105 |
| | | | 726/4 |
| 2010/0211705 A1* | 8/2010 | Alcouffe | H04L 63/02 |
| | | | 710/33 |
| 2010/0235561 A1* | 9/2010 | Goldring | G06F 13/385 |
| | | | 710/315 |
| 2010/0257353 A1* | 10/2010 | Cheng | H04L 63/0209 |
| | | | 713/153 |
| 2010/0290476 A1* | 11/2010 | Brindle | H04L 63/0209 |
| | | | 370/401 |
| 2011/0153969 A1* | 6/2011 | Petrick | G06F 21/606 |
| | | | 711/163 |
| 2011/0208963 A1* | 8/2011 | Soffer | G06F 21/85 |
| | | | 713/168 |
| 2013/0117556 A1* | 5/2013 | Coleman | H04L 63/18 |
| | | | 713/154 |
| 2013/0117995 A1* | 5/2013 | Sullivan | B23P 11/00 |
| | | | 29/464 |
| 2015/0039787 A1* | 2/2015 | Voorhees | G06F 3/0604 |
| | | | 710/17 |
| 2016/0043549 A1* | 2/2016 | Beauregard | H04L 67/34 |
| | | | 700/286 |
| 2016/0294826 A1* | 10/2016 | Han | H04L 63/0869 |
| 2016/0366179 A1* | 12/2016 | Coleman | H04B 10/00 |
| 2017/0118123 A1* | 4/2017 | Ishii | H04L 63/20 |
| 2017/0346851 A1* | 11/2017 | Drake | H04L 63/0428 |
| 2018/0048674 A1* | 2/2018 | Black | H04W 12/03 |

OTHER PUBLICATIONS

WIPO, "Written Opinion of International Searching Authority for PCT/US2021/031666," dated Jun. 23, 2021, 7 pgs.

"The Definitive Guide to Data Diode Technologies From Simple to State of the Art." Owl Cyber Defense Solutions, LLC, 2018.

Advenica AB. "SecuriCDS® DD1000i; Unidirectional data flow." Product Sheet, Doc. No. 17235v1.1. (2017).

Advenuca AB. "SecuriCDS® DD1000A, Unidirectional protection for Ethernet layer 2." Product Sheet, Doc No. 17237v2.1 (2018).

International Search Report dated Feb. 13, 2019 in counterpart International Application No. PCT/2018/066328.

* cited by examiner

ONE-WAY TRANSFER DEVICE WITH SECURE REVERSE CHANNEL

TECHNICAL FIELD

The present invention relates to the field of security, and in particular to a compact network device that provides hardware enforced one-way data transfer from a protected data source with a secure reverse channel.

BACKGROUND ART

Computer and network security is an area of considerable concern. While there is great interest in being able to remotely monitor resources such as industrial facilities across computer networks, lack of security of those monitored resources has required the development of specialized devices that provide defenses against security threats to computers, networks, and other devices in the monitored resources that go beyond the protection of firewalls and other traditional Internet security software and hardware systems. For high security resources, such as those used by government agencies and some commercial facilities, such as computer-controlled industrial facilities, energy, or water utilities, conventional firewall and other security systems may not provide reliable enough protection from undesired intrusions.

Today, we consider one single, high-value asset to be critical because to lose it would cause widespread disruption (for example: a power plant), but in aggregate, thousands of pieces of commercial equipment represent a similar threat and the number of attack vectors is exponentially higher. Widespread cyberattack of commercial or "subcritical" equipment, from building chillers to sewage pumps, would cause economic disruption and compromise public safety. For example, attacks on the air handlers in a region's hospital network, the refrigeration equipment at pharmacies and grocery stores, or the chilled water pumps serving Virginia's data centers could have severe impact.

For these types of resources, one-way data transfer may be a critical requirement to isolate the protected network from intrusion by malware or other malicious actors outside the protected network. While conventional Internet firewalls and software systems such as specially configured operating system may be designed to restrict data transfer to unidirectional data flow, software-based one-way data transfer systems are difficult to validate and verify, and may be subject to intentional or inadvertent misconfiguration that may allow data leakage or intrusions in the reverse direction.

Malicious attacks to date have focused largely on data theft or network disruption, but attacks on physical assets are becoming more frequent. Attackers can compromise IoT devices and, for example, (a) Recruit devices into botnets used for distributed denial of service (DDOS) attacks; (b) Open a back door into a corporate network; or (c) Change operating behavior of the device, leading to device failure or safety concerns.

Data diode devices have been developed to provide hardware-enforced one-way data transfer, using techniques as simple as severing the receive pin in an RS-232 cable to more complex techniques involving the use of optical cables or opto-isolator components that transfer electrical signals between two isolated circuits with light. An opto-isolator (also called an optocoupler) uses an optical emitter such as an LED that generates light responsive to electrical signals, while an optical sensor such as a phototransistor receives the light and converts the light into electrical signals. Because there is electrical isolation between the two sides of the opto-isolator, this physically enforces one-way communication across the opto-isolator.

However, because common Internet protocols depend upon two-way communication, a data diode requires additional components beyond an opto-isolator (or a simple serial cable with the receive line interrupted) to allow effective one-way communication.

Traditional data diodes are used to protect critical infrastructure, such as nuclear reactors or oil refineries by broadcasting equipment status in a one-way manner. These traditional data diodes are expensive and have required customization by skilled implementation teams.

SUMMARY OF INVENTION

One general aspect includes a data diode. The data diode includes a first processing element, a second processing element, a main channel coupled between the first processing element and the second processing element, providing hardware-enforced one-way communication from the first processing element to the second processing element, and a secure reverse channel coupled between the first processing element and the second processing element providing hardware-enforced one-way reverse communication from the second processing element to the first processing element. The reverse communication consists of a request to execute one of a predetermined set of commands.

A second general aspect includes a method of sending a command via a data diode. The method includes sending a request to execute the command via a secure reverse channel of the data diode that provides hardware-enforced one-way communication from a second processing element of the data diode to a first processing element of the data diode, executing the command responsive to a determination by the first processing element that the command is a member of a set of predetermined commands, and responding to the command with data transmitted via a main channel that provides hardware-enforced one-way communication from the first processing element to the second processing element.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

Figure 1:
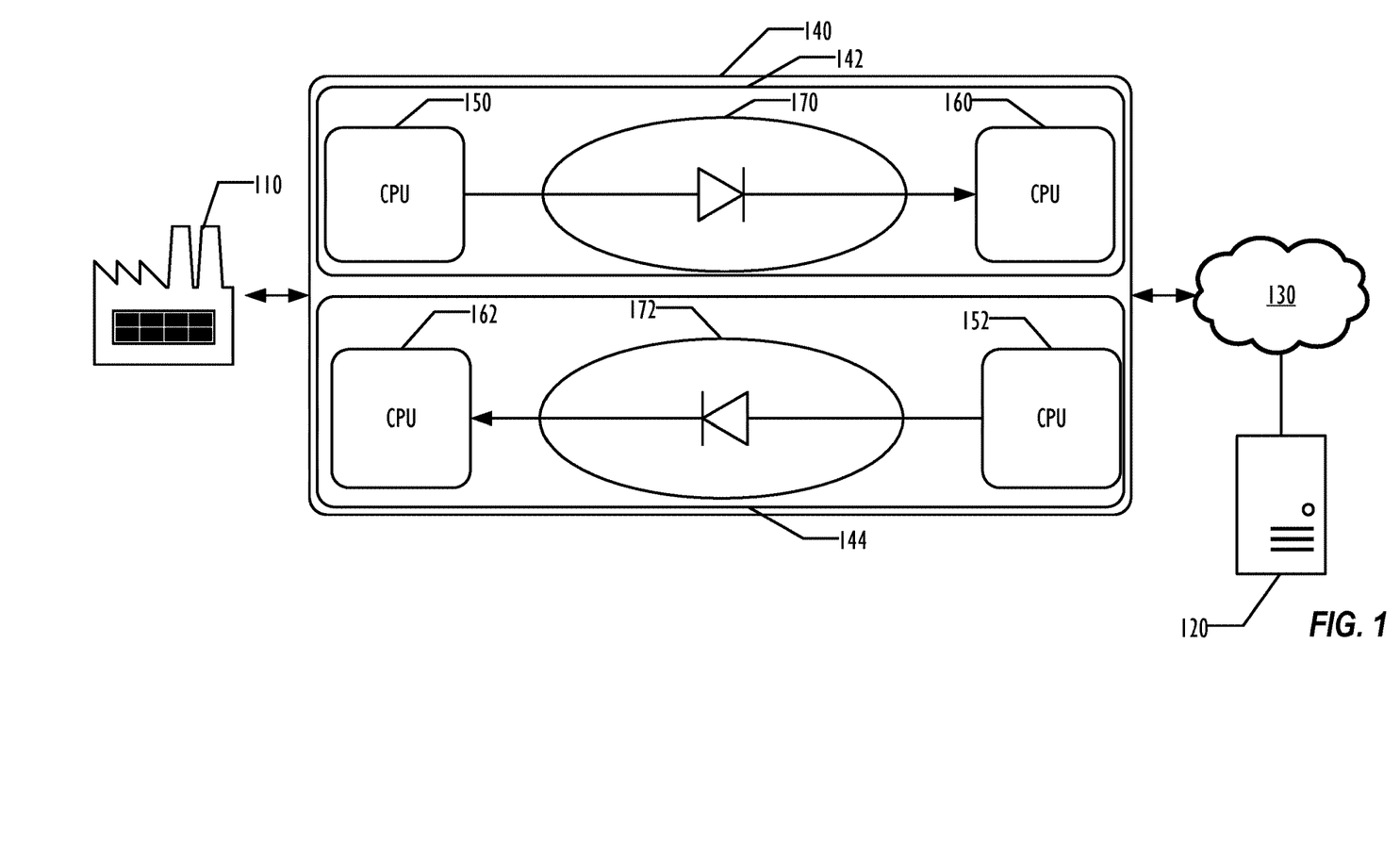
FIG. 1 is a high-level block diagram illustrating a data diode system according to one embodiment.

FIG. 1 is a block diagram illustrating the use of a data diode according to one embodiment. In this example, a data source 110, such as a factory or other protected facility, is to provide data to a destination 120, such as a monitoring server. In some implementations, either or both of the source 110 and destination 120 may be directly connected to the data diode 140, or may be connected to the data diode 140 by one or more networks, such as the cloud network 130 illustrated FIG. 1. Either the source or the destination, or both, may be remote or local to the data diode 140. Although a single source 110 and a single destination 120 are illustrated in FIG. 1 for clarity of the drawing, the data diode 140 may support one-way communications from multiple sources 110 and multiple destinations 120 as desired. In the example illustrated in FIG. 1, the source is directly connected to the data diode 140 and connected to destination 120 that is a server connected via a cloud network 130; however, the data diode 140 may be connected at the source to any type of equipment, directly or indirectly, with or without an intervening network of any type. Similarly, the data diode 140 may be connected at the destination to any type of equipment, directly or indirectly, with or without an intervening network of any type.

As illustrated in FIG. 1, the data diode 140 comprises both a main channel 142, allowing communication from source 110 to destination 120, and a secure reverse channel 144, allowing carefully limited communications from destination 120 to source 110. Embodiments of the data diode 140 may have either just a main channel 142 or both a main channel 142 and a secure reverse channel 144, depending on the intended usage. A data diode 140 that comprises both a main channel 142 and a secure reverse channel 144 may be operated using either or both of the main channel 142 and the secure reverse channel 144, as desired. As with the main channel 142, the reverse channel 144 uses hardware to enforce a one-way communication path in the reverse direction from main channel 142. In addition, however, the reverse channel 144 enforces limitations on the communications that can be sent via the reverse channel 144, to maintain security. These limitations are described in more detail below. In the description below, unless the reverse channel 144 is specifically referenced, mention of the data diode 140 and its functionality refers to the main channel 142 only.

Data diode 140 provides assurance that the data provided by source 110 is sent one-way only, physically preventing data from the destination 120 or elsewhere from reaching source 110. Data diode 140 generally comprises an onboard processing element 150 that communicates with source 110, an onboard processing element 160 that communicates with cloud 130, and a one-way coupler 170 that physically ensures that data passes only from processing element 150 to processing element 160, and not from processing element 160 to processing element 150. Processing elements 150 and 160 are programmed to allow the same data diode 140 to work with any of multiple protocols on either the source or destination side of the data diode, allowing a single model of the data diode 140 to be used in various environments without major configuration effort to accommodate various protocols.

Certain applications, including control of industrial equipment, can require commands be transmitted into the protected enclave. A data diode with the ability to securely send commands or messages in the reverse can provide additional functionality to the device while limiting the impact of a cyberattack.

Although illustrated in FIG. 1 with processing elements 150, 160 of the main channel separate from the processing elements 152, 162 of the reverse channel, embodiments may combine processing elements 150 and 152, processing elements 160 and 162, or both as desired. See FIG. 8 for an example in which processing elements 830 and 860 are used for both the reverse channel and the main channel of the data diode 800.

Figure 2:
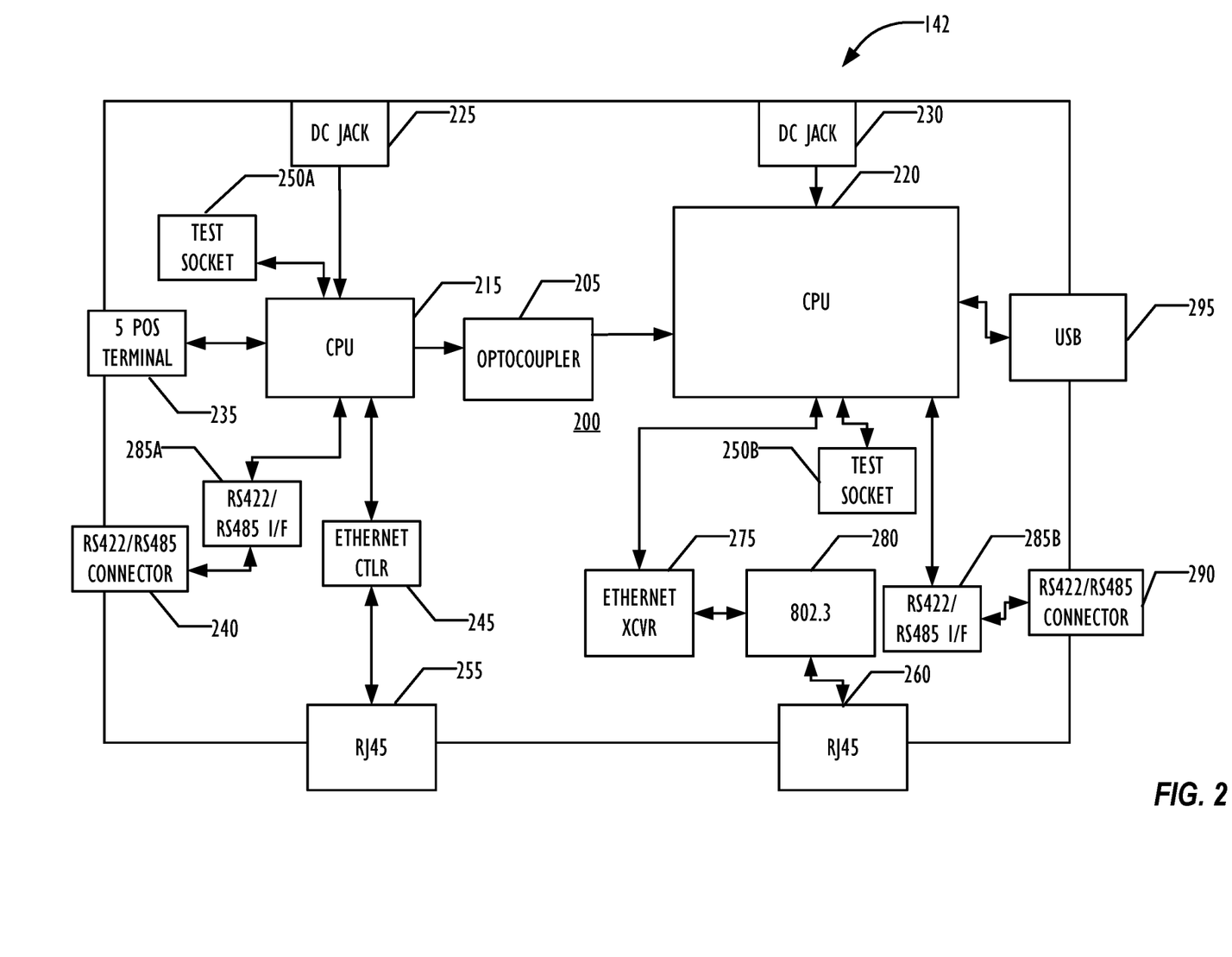
FIG. 2 is a block diagram illustrating components of a main channel of a data diode according to one embodiment.

FIG. 2 is a block diagram illustrating an example layout of the components of a main channel 142 of the data diode 140 according to one embodiment. In this figure, certain common elements have been omitted for clarity of the drawing, but one of skill in the art would understand that those elements would be present in operable embodiment. Connections are illustrated as logical connections between elements, and one of skill in the art would understand that connections between elements in the figure may involve multiple electrical traces instead of the single connector used to illustrate the connections between elements in the figure.

In one embodiment, a circuit board 200 may provide a base for mounting and connecting various components. Although identified as separate components by their function, one of skill in the art would understand that components illustrated as separate components may be combined into integrated components and that components illustrated as a single component may be split into separate components as desired.

The main channel 142 is comprised of two portions that communicate with each other in a one-way manner across one or more one-way data bridges that enforce one-way communication. In some embodiments, photocouplers (also known as optocouplers or optical isolators) may be used for this purpose. In other embodiments, a fiber optic elements, including a fiber optic cable, may be used. In other embodiments, a laser and a photodetector may be used instead of an optocoupler. In other embodiments, an infrared transmitter and receiver may be used. In other embodiments, non-optical technique may be used, such as an audio speaker and a microphone may be used. In each case, the components provide the ability to enforce the one-way communication physically. The same is true for the reverse channel 144.

Either the main channel 142, the reverse channel 144, or both may include rate-limiting circuitry to slow down incoming signals if desired.

As illustrated in FIG. 2, a photocoupler 205 provides one-way data bridges between two processing elements 215, 220, with the photocoupler provided for communication from processing element 215 to processing element 220. Although illustrated as providing one-way communication from processing element 215 to processing element 220, other embodiments may configure the photocoupler 205 for one-way communication from processing element 220 to processing element 215.

No other electrical path connects processing elements 215 and 220. As illustrated in FIG. 2, each "side" of the main channel 142 may have its own power connection through power jacks 225, 230, typically DC power jacks. Although not shown in FIG. 2, in some embodiments each portion of the main channel 142 is implemented with separate grounding, further ensuring there is no path for data to traverse the main channel 142 in the reverse direction from the intended direction.

Processing elements 215, 220 may be any desired type of processing elements, including processors, microcontrollers, field programmable gate arrays (FPGAs), etc. An example processing element may be an ARM® Cortex® processor from ARM Limited. (ARM and CORTEX are registered trademarks of ARM Limited.) Each of the processing elements 215, 220 must be powerful enough to perform protocol detection and conversion for a plurality of protocols. Each of processing elements 215 may be programmed with firmware code to perform protocol manipulation to allow the processing element 215, 220 to recognize a communication protocol used by the source 110 and destination 120, and process the communication in a way that successfully allows the one-way communication, even if either or both of the communication protocols used by the source 110 or destination 120 require two-way communication. In such a scenario, one or both of processing elements 215, 220 may communicate in a two-way communication with the source 110 or destination 120 to which the processing element 215, 220 is connected, acting as proxy while performing one way communication across the optocoupler 205 between processing elements 215 and 220. In some embodiments, the communication protocol used to communicate between processing elements 215 and 220 may differ from either or both of the communication protocols used by source 110 and destination 120. Preferably, the processing elements 215, 220 are programmed to recognize the communication protocols used by source 110 and destination 120 automatically, allowing the data diode 140 to be coupled between the source 110 and destination 120 without manual configuration by the user or with minimal configuration as desired. Processing elements 215, 220 may contain on-board memory for storing the firmware used for operating the processing elements 215, 220 in some embodiments. In other embodiments, off-chip memory components (not illustrated in FIG. 2) may be provided and coupled to the processing elements 215, 220.

As illustrated in FIG. 2, the main channel 142 provides a plurality of different type connectors, allowing the data diode 140 to be used in different types of connectivity environments without requiring different models of the data diode 140 that depend upon the desired type of connectivity. As illustrated in FIG. 2, the left side of the figure is configured as the source side for data transport and provides an RS422/RS485 connector 240, a 5 pin connector 235, and an RJ45 connector 255 for Ethernet connection between the processing element 215 and the source 110. Similarly, the right side of the figure is configured as the destination side for data transport and provides a USB connector 295, an RS422/485 connector 290, and an Rj45 connector for Ethernet connections between the processing element 215 and the source 110. In some scenarios, more and one of the connectors on either or both the source or destination portion of the main channel 142 may be operable at the same time. These connector types are illustrative and by way of example only, and other types of connectors may be used on either side of the main channel 142 in addition to or instead of the connectors illustrated in FIG. 2. In other embodiments, a single connector of any desired type may be provided on either side of the main channel 142, and different numbers and types of connectors may be provided on either side of the main channel 142 as desired.

Generally, there is two-way communication between any or all of the connectors 235, 240, and 255 and processing element 215, and between any or all of the connectors 295, 290, and 260 and processing element 220. As illustrated in FIG. 2, RS422/485 connector 240 is coupled to processing element 215 with RS422/RS485 interface 285A, while RS422/RS485 connector 290 is coupled to processing element 220 with RS422/RS485 interface 285B. In other embodiments, the processing elements 215, 220 may be capable of interfacing directly with RS422/RS485 connectors 240, 290 without an intermediary interface. As illustrated in FIG. 2, RJ45 connector 255 communicates with processing element 215 via Ethernet controller 245, while RJ45 connector 260 communicates with processing element 220 via IEEE 802.3 interface 280 and Ethernet transceiver 275. but other types of Ethernet coupling of the RJ45 connectors 255, 260 may be used.

In one embodiment, different components may be used for each "side" of the main channel 142. For example, RJ 45 connector 255 may be implemented in one embodiment with a RB1-125BAG1A connector manufactured by WIZnet, while RJ45 connector 260 may be implemented with a 2-406549-1 connector manufactured by TE Connectivity. In other embodiments, the same components may be used for both sides of the main channel 142.

In some embodiments, test sockets, such as test sockets 250A and 250B may be used for testing and debugging the hardware or firmware of the main channel 142. LEDs or other indicator devices may be included in the circuits of the main channel 142 to provide information for operation or debugging of the device. In some embodiments, the main channel 142 may include a display screen or a connector for a display screen to provide operational information. Similarly, embodiments of the main channel 142 may include an input device or a connector for an input device to allow information to be input into the device, such as for configuration purposes.

Each of processing elements 215 and 220 may include memory and firmware loaded into the memory for operation of the processing elements. The firmware comprises firmware to allow each of the processing elements 215 and 220 to act as a proxy for the source 110 or destination 120, and to manage the one-way communication between them even though either or both of source 110 and destination 120 communicate with the main channel 142 using two-way communication protocols.

In various embodiments, the firmware loaded into memory on the processing elements 215 and 220 for converting two-way communication to one-way communication may be implemented on one or both processing elements 215 and 220. Embodiments may include firmware that detects the protocol used by source 110 or destination 120 and loads an appropriate conversion firmware module to convert the protocol used by source 110 or destination 120 into a one-way protocol for communicating between the processing elements 215, 220. Communication between the processing elements 215, 220 may be performed according to a standard one-way communication protocol or may be performed in some embodiments using a non-standard one-way protocol specifically designed for the main channel 142.

For example, processing element 215 may detect a connection to source 110 that uses a TCP protocol and convert the TCP protocol into an encrypted one-way data protocol for communicating with the processing element 220, which may then reconvert the encrypted one-way data protocol into a TCP protocol for communicating with destination 120.

In one embodiment processing elements 215, 220 are preprogrammed with a plurality of protocol detection and conversion modules, allowing the data diode 140 to be placed into operation in a variety of environment without the need for pre-configuration. In some embodiments, because of the presence of a plurality of types of connectors on both the input and output sides of the main channel 142, the data diode 140 can be used with a connector to the source 110 of one type and a connector to the destination 120 of a different type. In some embodiments, control firmware may sequence between a predefined set of pre-loaded control protocols (such as BACnet, LonTalk, Modbus, DNP3, etc.), and determine what variables may be provided by the source 110, such as run time, system on/off status, temperature, fan speed, etc., and the processing element 215 or 220 may report those metrics across the optocoupler 205 at a predetermined interval or upon changes of the relevant metric. Similarly, in some embodiments, control firmware may sequence between a predefined set of pre-loaded control protocols for communicating with the destination. In some embodiments, one or more of processing elements 215 and 220 may encrypt the data received from the source 110 for delivery in encrypted form to destination 120, further enhancing the protection of the data from the source 110. Such encryption may be performed using any desired encryption technique, include symmetric and asymmetric encryption techniques.

In some embodiments, the source side processing element 215 or 220 may attempt to communicate using a preprogrammed sequence of queries until it has determined what protocols the source 110 uses and what variables the source 110 can report.

Although some embodiments may be implemented with a single circuit board 200 as illustrated in FIG. 2, embodiments may be implemented with two separate circuit boards that are connected by the optocoupler 205. The specific connectors and supporting interface circuits illustrated in FIG. 2 are illustrative and by way of example only, and other connectors and supporting interface circuits may be used. In some embodiments, some of the components illustrated as separate components in FIG. 2 may be combined into one or more integrated components and in some embodiments, components illustrated in FIG. 2 may be split into multiple components that together perform the desired function. The arrangement of components on the circuit board 200 of FIG. 2 is illustrative and by way of example only, and other arrangements can be used as desired. For example, in the illustrated embodiment of FIG. 2, the connectors 235, 240, 255, 260, 295, and 290 are on various edges of the circuit board 200, but in some embodiments, all of the connectors may be disposed on a single edge of the circuit board 200.

Figure 3:
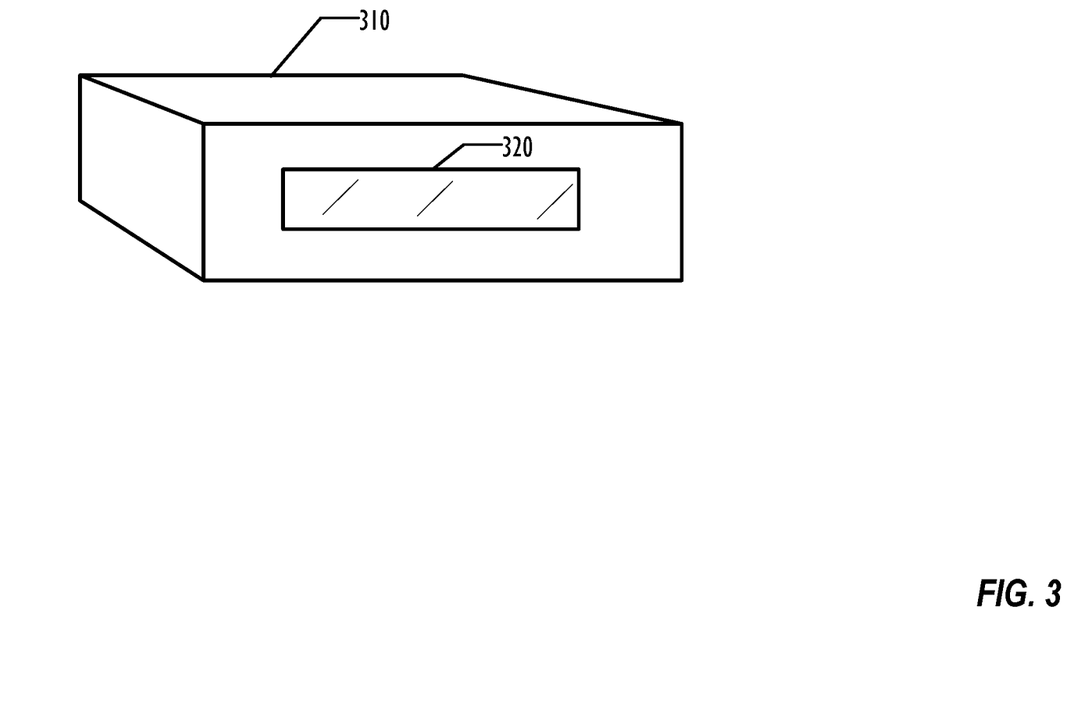
FIG. 3 is a perspective view of a housing for the data diode system according to one embodiment.

The circuit board 200 and the components disposed thereon are typically housed in a protective housing 310 as illustrated in FIG. 3, which may be of any desired shape and configuration. For example, the data diode 140 may be housed in a 1 U form factor case for mounting in a standard rack. In some embodiments, a transparent window 320 may allow viewing LEDs or other indicators disposed on the circuit board 200 to indicate the state of the data diode 140. Some embodiments may provide a housing 310 that employs tamper-resistant techniques to prevent or detect tampering with the data diode 140. In some embodiments, a plurality of data diodes 140 may be housed in a common housing 310 to act as channels for separate communication paths, where a plurality of links are desired between a single source 110 and a single destination 120, a single source 110 and a plurality of destinations 120, a plurality of sources 110 and a single destination 120, or a plurality of sources 110 and a plurality of destinations 120.

Although not illustrated in the figures, a reset function, such as reset button, may be made accessible on the protective housing to force a reset of the data diode 140 if desired.

Although preferably preconfigured to be plugged in and automatically activated, some embodiments may allow configuration of the data diode 140 at the installation site or elsewhere prior to operation. In some embodiments, the data diode 140 is not configurable on-site. In some embodiments, any type of wired or wireless connection technique may be used to connect the data diode 140 to another device, such as mobile device with an appropriate app, for in-field setup or management of the data diode 140 and for collecting information from the data diode 140 regarding its operation. A geolocation module (not shown in FIG. 2) may be incorporated in some embodiments to allow the data diode 140 to report its location as geolocation coordinates based on geolocation data from a global satellite-based navigation system or other geolocation data providers.

In some embodiments, the data diode 140 may be configured with reporting firmware to allow a cloud-based data collection, display, and analytics platform to collect usage data from the data diode 140 and allow a user to create custom alerts, detect tampering with the data diode 140, and receive recommended actions drawn from predictive analytics.

Figure 4:
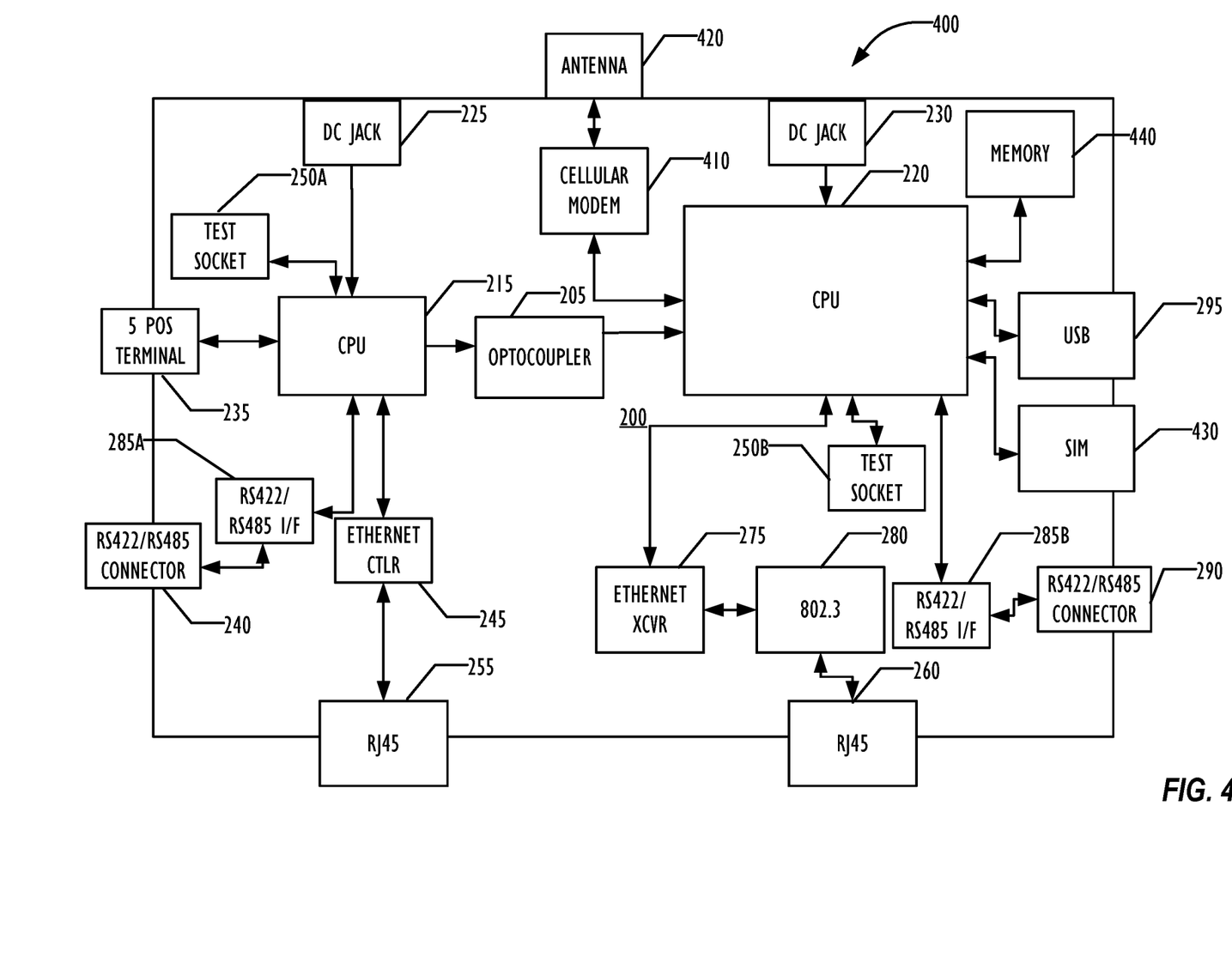
FIGS. 4-6 are block diagrams illustrating components of a main channel of a data diode according to other embodiments.

FIG. 4 is a block diagram illustrating a main channel 400 of a data diode according to another embodiment. As illustrated in FIG. 4, the circuit board 200 of the main channel 400 may contain the elements of the main channel 142 of FIG. 2, but also allows for outbound connectivity via an outbound communication interface comprising a cellular modem 410 that uses an antenna 420 for communicating with a cellular network. Any type of cellular modem 410 and antenna 420 may be used, employing any known cellular protocol for communication, including 3G, 4G, 5G, etc. Alternately, a non-cellular wireless transceiver and protocol may be used instead of a cellular modem and protocol, using any known wireless transceiver and protocol. In one embodiment, the antenna 420 extends outward from the main channel 400; in other embodiments, the antenna 420 may be formed in the housing 310.

In some embodiments, a subscriber identification module (SIM) card reader 430 may allow configuring cellular communications by inserting a SIM card that stores an international mobile subscriber identity (IMSI) number and its related key, to identify and authenticate a subscriber of the cellular network. Although illustrated as a reader for a physical SIM card in FIG. 4, in other embodiments circuitry for processing virtual SIMs instead of or in addition to a physical SIM card reader may be used, such as a memory for storing an eSIM or other types of virtual SIMs that allow using a cellular network without having to use a physical SIM card.

In some embodiments, a memory 440 may be provided for caching or buffering communication via the cellular modem 410, to avoid problems that may be caused by variability of signals in the cellular network. Such variability may be caused by issues within the cellular network or may result from movement of the data diode containing main channel 400 such as when installed in a vehicle, boat, railroad car, etc. that may be going in and out of cell phone coverage. The memory 440 can be of any desired size, such as 128 MB. In addition to caching or buffering communication data, the memory 440 may also be used for storing saving a last packet and status information if desired.

Although the main channel 400 of FIG. 4 is illustrated with both the memory 440 and SIM reader 430, either or both of those components may be omitted as desired.

As indicated in the discussion of FIG. 2, not all of the wired connectors and related components illustrated in FIG. 4 are required, and any of them may be omitted.

Figure 5:
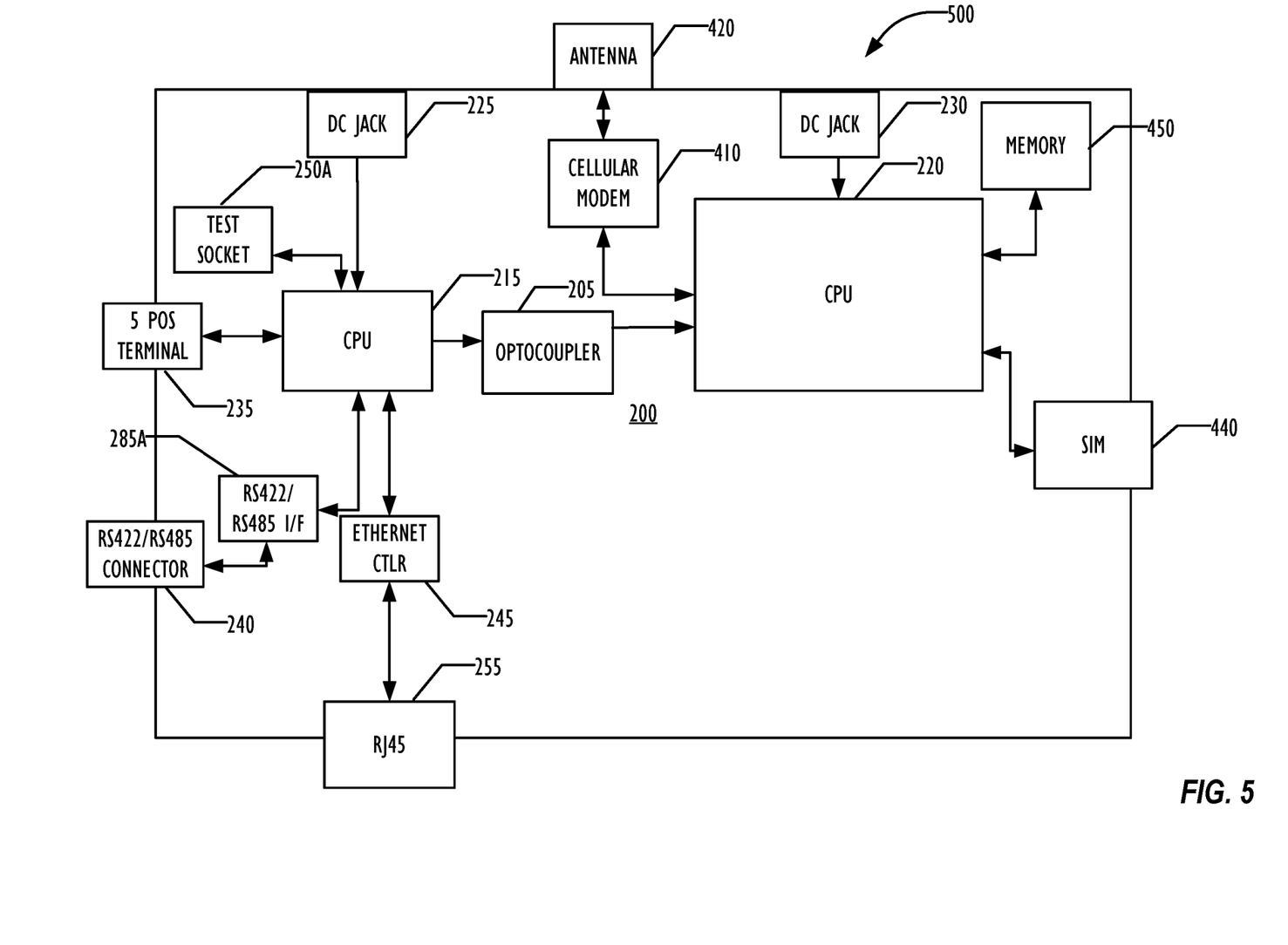

In FIG. 5, a block diagram of yet another embodiment illustrates a main channel 500 of a data diode in which all of the outbound wired connectors of the main channel 142 of FIG. 2 and the main channel 400 of FIG. 4 are omitted, providing a communication interface that only provides cellular connectivity on the outbound side of the main channel 500 of the data diode without the wired components and connectors illustrated in FIGS. 2 and 4.

Figure 6:
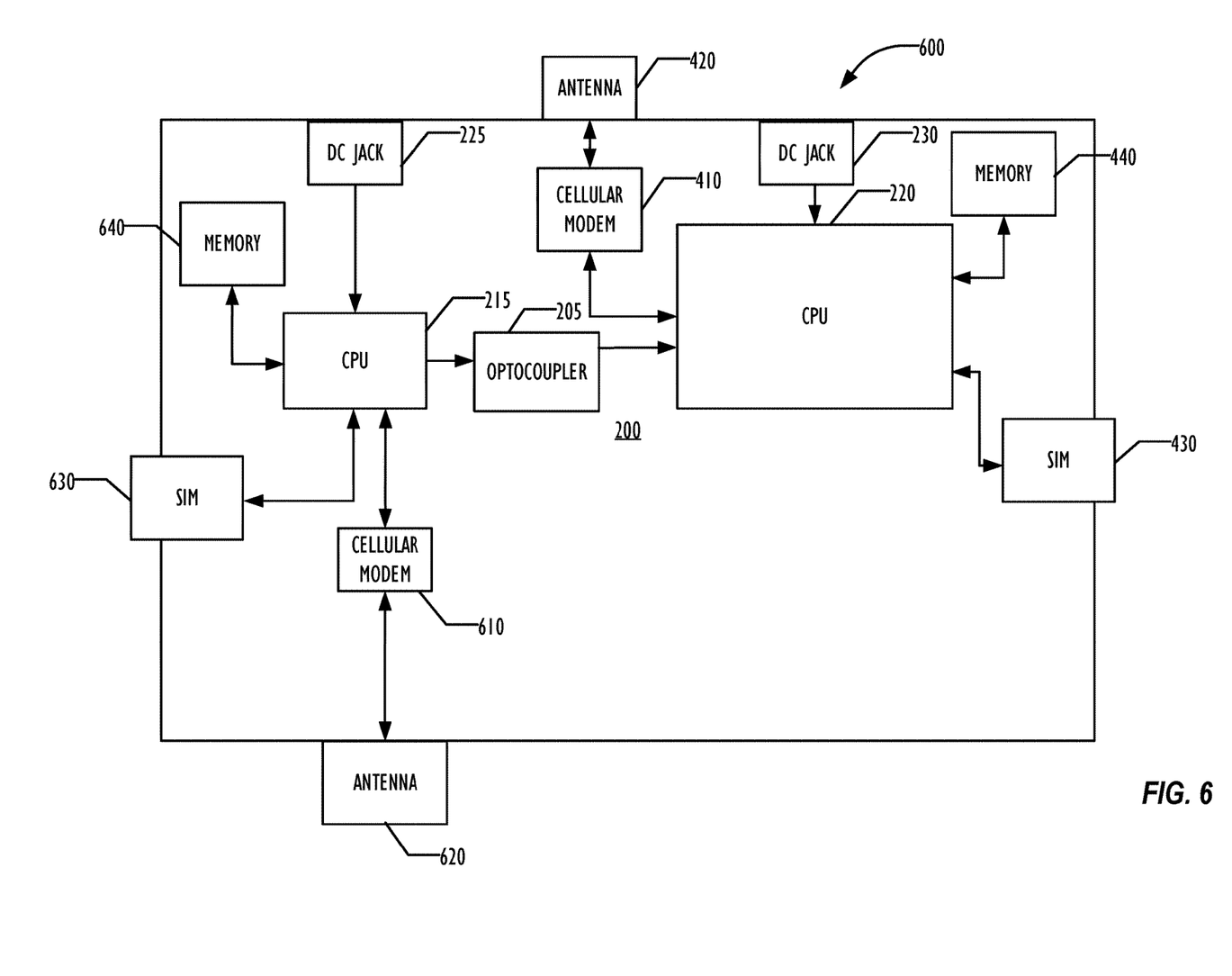

In FIG. 6, a block diagram of yet another embodiment illustrates a main channel of a data diode 600 in which the inbound connectors of the inbound communication interface of the main channels 142, 400, and 500 of FIGS. 2 and 4-5 are omitted. In this embodiment the inbound communication interface provides only cellular connectivity on the inbound side of the data diode 600, as well as an outbound communication interface with cellular connectivity. As on the inbound side, a cellular modem 610, which can be a different from the cellular modem 410, provides cellular communication via antenna 620, and may be configured by a SIM card inserted into SIM reader 630 and employ a memory 640.

In other embodiments, the inbound cellular components can be combined with the wired inbound components, similar to the embodiment illustrated in FIG. 4 for the outbound side. Thus, either or both the inbound and outbound sides of data diodes may employ cellular communication components in addition to or instead of wired components.

Although FIGS. 4-6 illustrate embodiments with inbound and outbound communication interfaces using cellular modems for communication with a data diode, other types of wireless communication components may be deployed in various embodiments allowing for non-cellular wireless communication with either or both the inbound and outbound side of the main channel 142, in addition to or instead of cellular or wired connectivity. For example, wireless components can be deployed for WI-FI®, Bluetooth®, LORA®, satellite, ZIGBEE®, and Z-WAVE communications, and any other desired type of wireless communications. (WI-FI is a registered trademark of WiFi Alliance; Bluetooth is a registered trademark of Bluetooth SIG, Inc.; LORA is a registered trademark of Semtech Corporation; ZIGBEE is a registered trademark of ZigBee Alliance; Z-WAVE is a registered trademark of Silicon Laboratories, Inc.) Any combination of any of the wired or wireless (including cellular) communication techniques may be provided on either the inbound or outbound side of the main channel 142.

Figure 7:
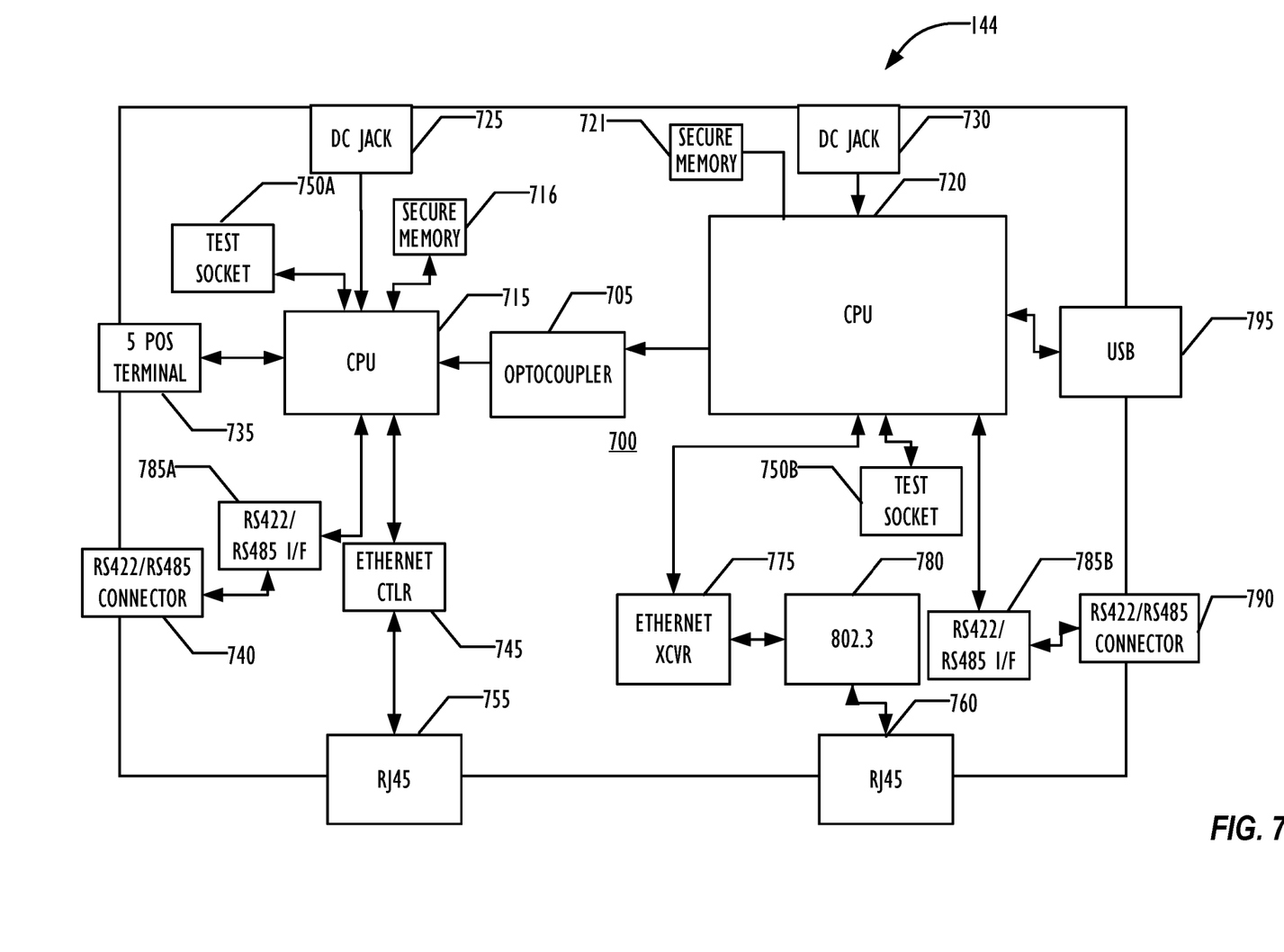
FIG. 7 is a block diagram illustrating components for a secure reverse channel for a data diode according to one embodiment.

Turning now to the reverse channel 144, FIG. 7 is a block diagram illustrating a reverse channel 144 for the data diode 140 according to one embodiment. Many of the elements 705-795 of reverse channel 144 as illustrated in FIG. 7 are identical to elements 205-295 of main channel 142 in FIG. 2, except that the optocoupler 705 is oriented in the reverse direction, allowing one-way reverse channel traffic with security restrictions as described below. Although illustrated as an optocoupler 705 in FIG. 7, as with the main channel 142 described above other hardware techniques may be used to enforce one-way reverse communication across the reverse channel 144, without using optical isolation. In some embodiments, the power supplies for the reverse channel 144 may be independent of the power supplies for the main channel 144 and separate power supplies may be provided for each side of the reverse channel 144. Other embodiments of the reverse channel 144 may be implemented similar to the embodiments for the main channel illustrated in FIGS. 4-6. Similar to the way in which different components may be used on each side of the main channel, different components may be used on each side of the reverse channel, and the reverse channel may employ different components from the main channel, providing additional security.

In some embodiments, main channel 142 and reverse channel 144 may share connectors with each other, to avoid the need to bring (for example) two Ethernet cables into the data diode 140 from data destination 120 or data source 110. However, other embodiments may avoid sharing connectors between main channel 142 and reverse channel 144 for additional security.

In some embodiments, one or more of the processing elements 720 and 715 may include one or more secure memory circuitry 716, 721 that is only rewritable with physical access to the equipment, to store pre-selected commands, to compare incoming commands against, to determine if they should be passed. Commands in the secure memory may be referred to by a registry location, such that after successful comparison of an incoming command to the commands stored in the secure memory, only an identifier (command number or registry location) is passed between processing elements 720 and 715 such that the processing element 715 then retrieves the correct command and sends it out to the data source 110. For additional security, embodiments may include a hash value for commands passed between processing elements 720 and 715, to verify that the secure memory 716 or 721 has not been compromised. For example, should someone change the set of acceptable commands stored in secure memory 716, a command sent across the reverse channel could query the hash value from the processing element 715, returning the hash value to the data destination 120. By detecting the change in hash value from a known acceptable value, the change to the secure memory 716 could be safely detected. In another example, should someone change the set of acceptable commands stored in secure memory 721, by having processing element 720 include the hash value for secure memory 721 when sending commands across the reverse channel, processing element 715 can detect a change in the hash value and thus detect a change to secure memory 721.

The reverse channel 144 is configured to allow carefully limited data to be sent from the data destination 120 of FIG. 1 to the data source 110 of FIG. 1 securely. That limited data may include digital streams of data, files, etc. In some embodiments, the data sent over the reverse channel 144 are a request to execute one or more discrete digital commands of a predetermined set of digital commands. In some embodiments, the data is converted to analog signals, including electrical voltages, optical light pulses, or optic colors of light. The data sent over the reverse channel 144 may represent discrete, pre-determined messages or commands, rather than the commands themselves. E.g., data sent over the reverse channel 144 may indicate "Message 2"; the processing element 715 may then interpret or look up "Message 2" to cause "Command 2," which corresponds to "Message 2," to be executed, without actually sending "Command 2" across the reverse channel 144. In this example, processing element 720 may receive the actual command corresponding to Command 2 and convert that into Message 2 before sending it across the reverse channel to processing element 715.

In such embodiments, processing element 720 may receive a command or message to be transmitted to the data source 110. As illustrated in FIG. 7, processing element 720 may translate the command or message into a secure data for communicating to the data source 110 across optical isolator 705 to processing element 715, which may then confirm the validity of the received secure data, and cause execution of the command or transmittal of the command or message to the data source 110.

In some embodiments, processing elements 720 may receive analog data or predetermined indications of messages or commands (e.g., an indication of one of a predetermined set of commands or messages). The processing element 720 or the processing element 715 may then be programmed to interpret the analog data or indication of the command or message and convey the desired command or message to the data source 110.

In some embodiments, a time lag or other mechanism may be used to allow for external validation or confirmation of the received command. This confirmation may be triggered by sending an outbound signal and awaiting a confirming inbound signal. The confirmation may require the use of some special set of codes, keys, or other desired validation process, including rolling authentication or encryption and two factor authentication techniques. The confirmation or validation in some embodiments may be performed by a separate external system (not shown in the Figures) that may be different from the data destination 120. This would allow the reverse channel 144 to be simpler, without the onboard capacity to determine the authenticity of commands. A valid command, received and properly authenticated, may be sent to processing elements 715 for execution either by processing element 715 or passing on for execution to the data source 110.

If the command is not recognized by the secure reverse channel 144, the reverse channel 144 may reject the command. While some embodiments may allow transfer of specific pre-determined files or message across the reverse channel, there is no way to send an arbitrary file or other message across the reverse channel, thus eliminating the ability to send malware or unauthorized commands to the data source 110 protected by the data diode 140.

In some embodiments, the processing element 215 or 720 may perform deep packet inspection of each data packet received to determine appropriate content and perform validation before being passed across the optical isolation element 705. In some embodiments, the processing elements 220, 215, 720 and/or 715 may support Transport Level Security (TLS), Internet Protocol Security (IPsec), and virtual private networks (VPNs) to secure the communications links to their respective networks. Embodiments may further perform encryption and decryption and data authentication using symmetric or asymmetric encryption and decryption techniques that employ a public-private key certificate or other encryption and decryption techniques.

In some embodiments, processing element 720 may convert a digital input received from data destination 120 into an analog signal before passing the analog signal through the optocoupler 705, such as using a 4 to 20 milliamp analog signal. However, the optocoupler 705 is not limited to an analog optocoupler. For example, an optocoupler that couples both analog and digital signals, such an LOC110P from ISYS Integrated Circuits Division, can be used as optocoupler 705 with appropriately placed digital-to-analog and analog-to-digital converters.

In some embodiments, configuration of the reverse channel 144 may be permitted only on the protected side that employs processing element 715, and may require physical access, such as a field technician with the right tools, software, and credential keys, in addition to or instead of configuration at the manufacturing facility for the data diode 140. Preferably the allowed commands are burned into the data diode 140 before deployment, prohibiting changing the allowable commands over the network.

By limiting commands received from the data destination 120 across the reverse channel 144, the data diode could limit the acceptable range of actions performed by command, for example allowing a command to reset a thermostat from −14° C. to −1° C., but rejecting a command to change the thermostat to 25° C.

Upon accepting a command associated with a request received via the reverse channel 144, the main channel 142 may be used to send a response to the command.

Although described above in terms of the reverse channel 144, the main channel 142 may in some embodiments limit the data that is permitted to travel from the data source 110 to the data destination 120. For example, in a situation where someone gains access to a utility substation (the data source 110) and adds something to the network there, by limiting data flow to only valid Distributed Network Protocol 3 (DNP3) commands, the data diode 140 may prevent introducing malicious code or data from the data source 110 into the data destination 120.

In some embodiments, the physical isolation provided by optocoupler 705 or its alternatives may be omitted, and using firmware control to limit the reverse channel to the predetermined input values for commands, etc. Techniques such as varying analog voltage levels on an electrical trace to provide a form of isolation to limit what commands could be pushed between processing elements 720 and 715, but preferably the isolation should be enforced by physical separation.

Figure 8:
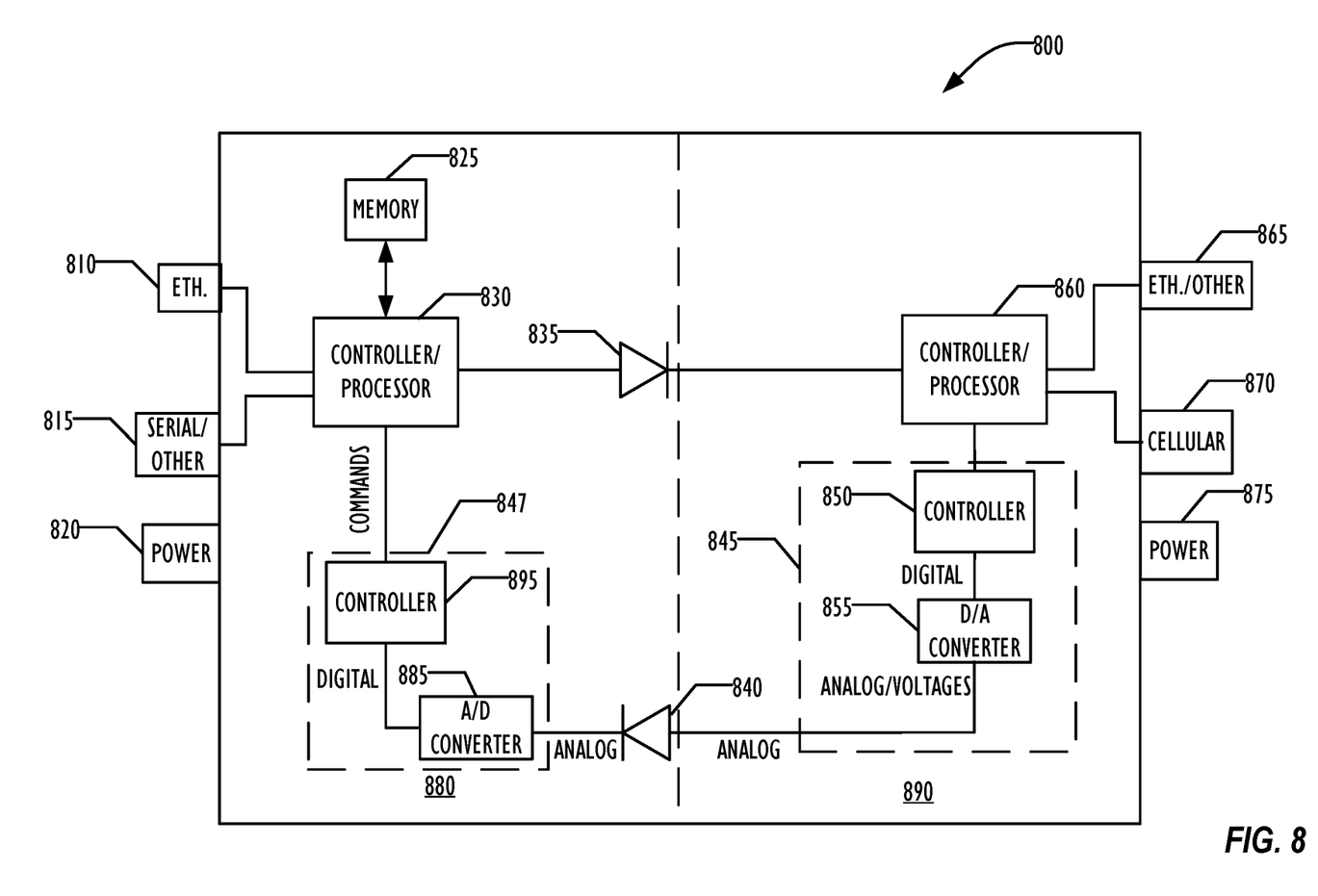
FIG. 8 is a block diagram illustrating components for a two-way data diode system according to one embodiment.

FIG. 8 is a block diagram illustrating a two-way data diode 800 according to one embodiment. For clarity of the drawing, some of the elements illustrated in FIGS. 2-7 have been omitted, but should be understood as included and functioning as described in the descriptions of FIGS. 2-7. In this embodiment, commands received via ethernet or other connector 865 or the cellular connector 870 may be transmitted to the controller/processing element 860. If the controller/processing element 860 decides to send the commands to the protected controller/processing element 830 via the secure reverse channel hardware enforced isolation component 840, digital data corresponding to the commands may be sent to a command converter unit 845, which in one embodiment may comprise a controller 850 and a digital to analog converter 855, which converts the digital command data into analog voltages. For example, digital commands may be converted into 4-20 mA voltages or any other type of analog signal that may be desired. Once the analog voltages pass through the secure reverse channel hardware enforced isolation component 840, a second command converter unit 847 may be used to convert the analog voltages back into digital commands, using an analog to digital converter 885 and a controller 895. The use of the digital to analog converter 855, controller 850, analog to digital converter 885, and controller 895 is illustrative and by way of example only, and other techniques may be used to ensure that data packets received from the controller/processing element 860 are not transmitted in that form to the controller/processing element 830. For example, a digital optocoupler, such as an LOC110P from IXYS Integrated Circuits Division, may be used as the secure reverse channel hardware enforced isolation component 840. In such an embodiment, both command converter unit 845 and command converter unit 847 may be placed between the secure reverse channel hardware enforced isolation component 840 and the controller/processing element 830 instead of as illustrated in FIG. 8.

Other components may be used to implement the command converter units 845 and 847 to prohibit data packets from passing across the secure reverse channel hardware enforced isolation component 840 to the controller/processing element 830.

The controller/processing element 830 may then analyze the commands and perform them if the analysis considers the commands acceptable to perform. The analysis performed by controller/processing element 830 may involve the use of memory 825, as well as data received via ethernet connector 810 or serial/other connector 815. Responses to the commands may be sent back to controller/processing element 860 via the forward channel hardware enforced isolation component 835. The responses may include information about the status of the protected side 880 of the two-way data diode, information received from the data source 110, or both. The responses, when received on the unprotected side 890 may then be processed by the controller/processing element 860 and sent to the data destination 120 as desired.

Although not illustrated in FIG. 8, a cellular interface may be provided on the protected side 880 of the two-way data diode and a serial/other interface may be provided on the unprotected side 890 of the two-way data diode.

Although illustrated in FIG. 8 with processing elements 830 and 860 handling both the main channel and the reverse channel of the data diode 800, as illustrated in FIG. 1, separate processing elements may be used for the main channel and the reverse channel.

The arrangement of components in the data diodes of FIGS. 2 and 4-8 are illustrative and by way of example only, and other arrangements can be used as desired. For example, in the illustrated embodiment of FIG. 2, the connectors 235, 240, 255, 260, 295, and 290 are on various edges of the circuit board 200, but in some embodiments, all of the connectors may be disposed on a single edge of the circuit board 200.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A data diode, comprising:
   a first processing element;
   a second processing element;
   a main channel coupled between the first processing element and the second processing element, providing hardware-enforced one-way communication from the first processing element to the second processing element;

a secure reverse channel coupled between the first processing element and the second processing element providing hardware-enforced one-way reverse communication from the second processing element to the first processing element; and a cellular interface coupled to the second processing element and configured to transmit to a destination data received from a source via the main channel, where the reverse communication consists of a request to execute one of a predetermined set of commands.

2. The data diode of claim 1, wherein the main channel comprises a first optocoupler configured to pass data from the first processing element to the second processing element, and wherein the secure reverse channel comprises a second optocoupler configured to pass the reverse communication from the second processing element to the first processing element.

3. The data diode of claim 2, wherein the second optocoupler is an analog optocoupler.

4. The data diode of claim 2, wherein the secure reverse channel further comprises:

a first controller configured to receive the request as a first digital data; and a digital to analog converter coupled to the first controller configured to convert the first digital data into an analog signal.

5. The data diode of claim 4, wherein the secure reverse channel further comprises:

a second controller; and an analog to digital converter coupled to and controlled by the second controller and configured to:

receive analog signals from an analog optocoupler, and convert the analog signals into a second digital data, wherein the second controller converts the second digital data into the request.

6. The data diode of claim 1, further comprising a cellular input interface coupled to the first processing element and configured to receive data from a source for transmission to a destination via the main channel.

7. The data diode of claim 1, wherein the secure reverse channel comprises a digital optocoupler.

8. The data diode of claim 7, further comprising:

a first converter unit; and a second converter unit, coupled to the first converter unit, wherein the digital optocoupler passes the request received from the second processing element to the first converter unit, wherein the first converter unit converts the request into an analog signal, and wherein the second converter unit converts the analog signal, upon receipt from the first converter unit, into the request.

9. The data diode of claim 1, wherein the request comprises a command of the predetermined set of commands.

10. The data diode of claim 1, wherein the request comprises a representation that corresponds to a command of the predetermined set of commands, and wherein the first processing element interprets the representation to determine the command.

11. The data diode of claim 1, wherein the first processing element comprises:

a secure memory circuitry that is only rewritable with physical access to the data diode, in which the set of predetermined commands is stored, wherein the first processing element compares the request with the set of predetermined commands to determine whether to accept the request.

12. The data diode of claim 11, wherein the request is an identifier corresponding to one of the set of predetermined commands stored in the secure memory circuitry.

13. The data diode of claim 11, where the request is a location in the secure memory circuitry.

14. The data diode of claim 11, wherein a hash value corresponding to a command associated with the request is returned by the first processing element in response to the request.

15. The data diode of claim 14, wherein a change to the secure memory circuitry is detectable by comparing the hash value returned by the first processing element in response to the request with a known acceptable value.

16. The data diode of claim 11, wherein the request comprises a hash value corresponding to a command of the set of predetermined commands stored in the secure memory circuitry, and wherein the first processing element detects a change in the secure memory circuitry by using the hash value.

17. A method of sending a command via a data diode, comprising:

sending a request to execute the command via a secure reverse channel of the data diode that provides hardware-enforced one-way communication from a second processing element of the data diode to a first processing element of the data diode;

executing the command responsive to a determination by the first processing element that the command is a member of a set of predetermined commands;

responding to the command with data transmitted via a main channel that provides hardware-enforced one-way communication from the first processing element to the second processing element; and transmitting the data to a destination via a cellular interface coupled to the second processing element.

18. The method of claim 17, wherein sending the request comprises converting the request from a first digital data to an analog signal then converting the analog signal to a second digital data.

19. The method of claim 17, further comprising:

storing the set of predetermined commands is stored in a secure memory circuitry of the first processing element; and detecting a change to the set of predetermined commands.

* * * * *

UNITED STATES PATENT AND TRADEMARK OFFICE
CERTIFICATE OF CORRECTION

PATENT NO. : 11,153,345 B1  
APPLICATION NO. : 17/302696  
DATED : October 19, 2021  
INVENTOR(S) : Sang Cheon Lee et al.

Page 1 of 1

It is certified that error appears in the above-identified patent and that said Letters Patent is hereby corrected as shown below:

In the Specification

Column 1, Line 3, should read:
--This Invention was made with U.S. Government support under Contract No. DE-SC0018780 awarded by the Department of Energy. The Government has certain rights in this invention.--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*